Aug. 7, 1928.

Re. 17,061

H. G. JORGENSEN

JOINT STRIP

Original Filed May 25, 1923

Inventor:
Hans G. Jorgensen,
by Charles E. Mullen
His Attorney.

Reissued Aug. 7, 1928. Re. 17,061

UNITED STATES PATENT OFFICE.

HANS G. JORGENSEN, OF ERIE, PENNSYLVANIA, ASSIGNOR, BY MESNE ASSIGNMENTS, TO GENERAL ELECTRIC COMPANY, A CORPORATION OF NEW YORK.

JOINT STRIP.

Original No. 1,632,903, dated June 21, 1927, Serial No. 641,374, filed May 25, 1923. Application for reissue filed June 21, 1928. Serial No. 287,258.

The invention relates to a joint strip having means for attaching and holding the same in place. The invention is particularly disclosed herein as applied to the joint between the hood of an automobile and the supporting surfaces at the ends of the hood. The hood working on these surfaces squeaks or rattles and there is usually provided some sort of yielding material such as leather strips or belt lacings for preventing a metallic contact of the hood with the parts on the body. According to my invention a strip is provided having means for attaching and holding the same in place which permit the strip to be easily applied and afford other advantages hereinafter specified. The invention is obviously applicable to joints other than those in automobiles and without regard for whether the purpose for which the strip is used is to prevent rattling or any of the other purposes for which joint strips are used.

The invention is illustrated in the accompanying drawings as follows:—

Figure 1:
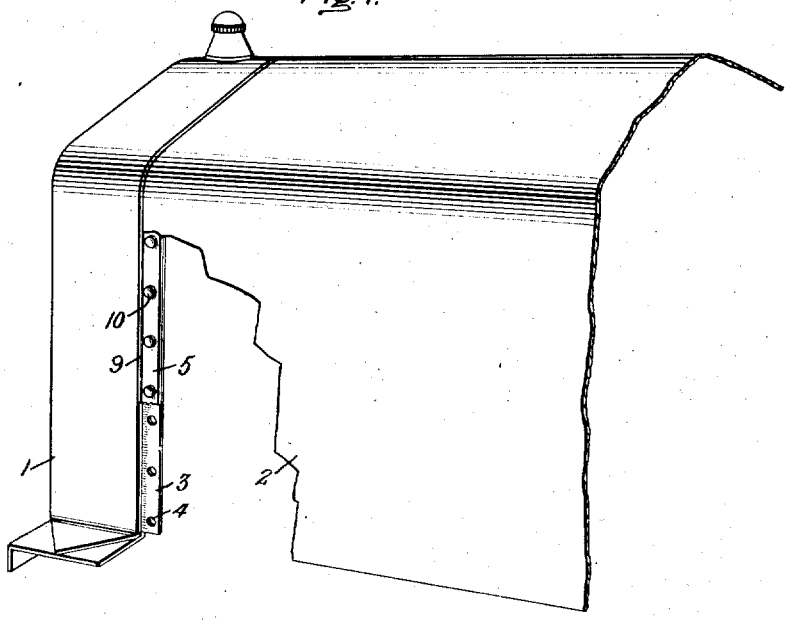

Fig. 1 shows a perspective view of a portion of a hood.

Figure 2:
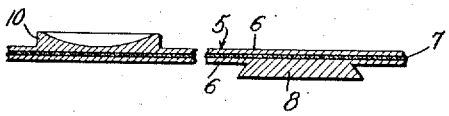

Fig. 2 a central longitudinal section through a portion of the joint strip.

Figure 3:
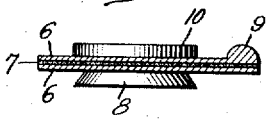

Fig. 3 a cross section of the same.

Figure 4:
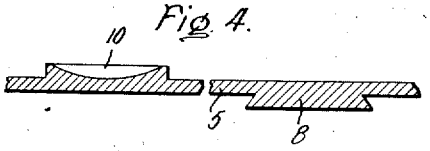

Fig. 4 a central longitudinal section of an alternative construction.

1 marks a radiator frame, 2 a hood, 3 a hood-supporting projection on the radiator, and 4 perforations extending from the projection 3 and through which as before stated there has been heretofore commonly arranged leather prongs or lacings.

A joint strip 5 is formed of the outer layers 6 of rubber and a central or re-enforcing layer 7 of fabric. These are vulcanized together in the ordinary manner, the fabric being slightly yieldable but strengthening the strip as a whole. Undercut projections 8 extend from the inner face of the strip. These are arranged at intervals along the strip to bring them approximately into register with the openings 4. The strip yields sufficiently so that if there is a slight variation the strip readily takes up this variation in putting in place so that the strip is drawn taut along the projection 3. The projections 8 are of a size so as to require some compression in forcing them through the openings so that when they are in place they yieldingly resist the detachment of the strip and thus hold it securely in place.

I prefer to provide a rib 9 along the front face of the strip which will engage the edge of the hood when it is closed, thus finishing the joint and preventing the edge of the hood rubbing against the back edge of the radiator frame.

I also prefer to provide protuberances 10 along the outer face of the strip which form a geater thickness of yielding material at intervals and thus give a softer support for the hood and I further provide these protuberances with vacuum cupped faces so that as the hood contact is continued there is a direct engagement between the hood and these protuberances. It will be noted that the protuberances are between the projections 8 and consequently if there is a little end movement of the hood the strip readily follows this even though there is a direct engagement or adhesion of the protuberances with the end surface of the hood.

In some instances I prefer to form the strip entirely of rubber. This is particularly so where there is an unusual variation in the distances between the openings 4 as the rubber can be readily stretched to accommodate it to such variations.

What I claim as new is:

1. A joint strip of yielding material with projections formed on one face adapted to enter perforations on a joint member to secure the strip in place, the yielding material permitting a variation in the distance between the projections.

2. A joint strip of yielding material with under-cut yielding projections formed on one face adapted to enter perforations on a joint member to secure the strip in place, the yielding material permitting a variation in the distance between the projections.

3. A joint strip of yielding material with projections formed on one face adapted to enter perforations on a joint member to secure the strip in place, the yielding material permitting a variation in the distance between the projections, and supporting protuberances on its opposite face, said protuberances having vacuum cupped faces.

In witness whereof, I have hereunto set my hand this 18th day of June, 1928.

HANS G. JORGENSEN.